July 8, 1924.

J. SCHERNER

TIRE WRAPPING

Original Filed Aug. 7, 1919   2 Sheets-Sheet 1

1,500,472

Witness:
Ira M. Jones.

Inventor
John Scherner
By Morsell + Keeney
Attorneys.

July 8, 1924.

1,500,472

J. SCHERNER

TIRE WRAPPING

Original Filed Aug. 7, 1919  2 Sheets-Sheet 2

Witness:
Ira M. Jones

Inventor:
John Scherner
By Morsell & Keeney
Attorneys

Patented July 8, 1924.

1,500,472

UNITED STATES PATENT OFFICE.

JOHN SCHERNER, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

TIRE WRAPPING.

Application filed August 7, 1919, Serial No. 315,914. Renewed October 4, 1923.

*To all whom it may concern:*

Be it known that I, JOHN SCHERNER, a citizen of the United States, and resident of Milwaukee, in the county of Milwaukee and State of Wisconsin, have invented new and useful Improvements in Tire Wrapping, of which the following is a description, reference being had to the accompanying drawings, which are a part of this specification.

The present invention relates to an improved wrapping for bodies of annular form, more particularly vehicle tire shoes, and the method of applying the wrapping to the body.

My invention has for one of its objects to provide a method of wrapping tire shoes with a covering having a certain degree of elastic qualities so that the same will not be injured by the distorting flexure of the body under the shocks of handling.

Another object of this invention is to provide a covering or wrapping for vehicle tire shoes which will be circumferentially engaged with the tire shoe and provided with pleats or crimpings to conform the same to the sides of the tire shoe and then provided with means for securing the edges of the covering together.

A further object of the present invention is to provide a wrapping for annular bodies which will present an unbroken circumferential surface.

A still further object of the present invention is to provide a covering or wrapping for vehicle tire shoes which will have tape means for securing the covering on the tire, the tape having suitable designations thereon giving the character of the tire enclosed.

With the above and other objects in view which will appear as the description proceeds, my invention resides in the novel construction, combination and arrangement of parts substantially as hereinafter described and more particularly defined by the appended claim, it being understood that such changes in the precise embodiment of the herein disclosed invention may be made as come within the scope of the claim.

Figure 1:
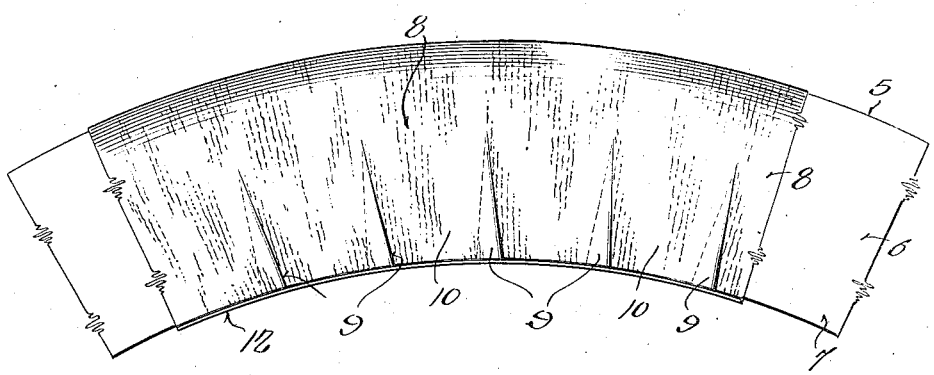
Figure 2:
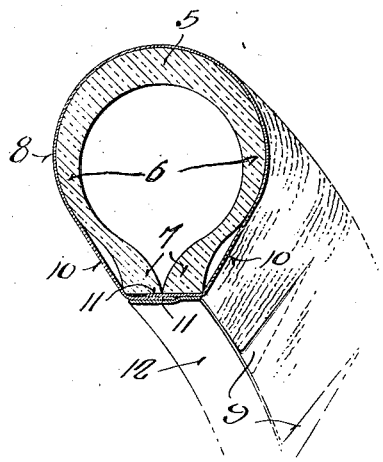
Figure 3:
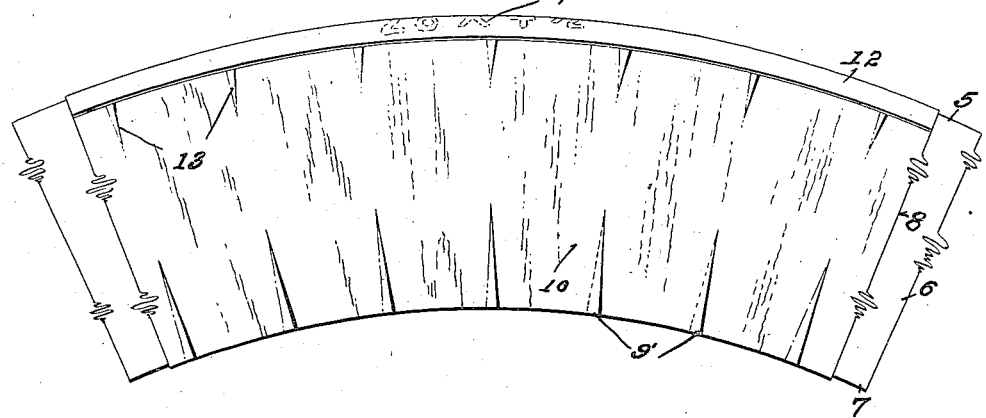
Figure 4:
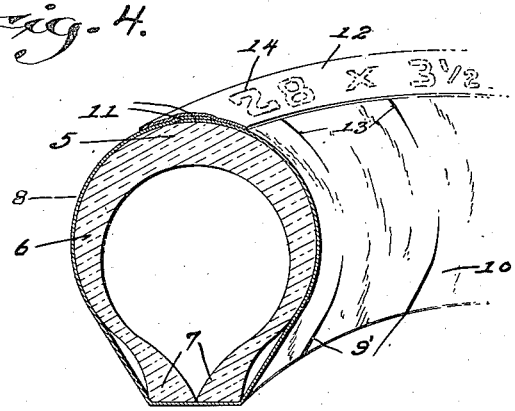

In the accompanying drawings I have illustrated two complete examples of the physical embodiment of my invention constructed according to the best modes I have so far devised for the practical application of the principles thereof, and in which:

Figure 1 is a side view of a portion of a pneumatic vehicle tire shoe enclosed in a wrapping embodying my invention, Figure 2 is a perspective view of a portion of a pneumatic tire shoe enclosed with my improved wrapping, Figure 3 is a view similar to Figure 1 of a slightly modified form of wrapping, and Figure 4 is a view similar to Figure 2 of that form of my invention depicted in Figure 3.

Referring now more particularly to Figures 1 and 2 of the accompanying drawings, 5 designates the tread portion of a tire shoe, 6 the sides thereof, 7 the rims thereof, and 8 my improved wrapping which is preferably formed of crêpe paper or any other material having a degree of elastic qualities.

The wrapping 8 is preferably in an elongated strip placed circumferentially about the tire casing, so that its medial portion engages the tread 5, the covering conforming to the contour of the tread portion 5 by reason of its elastic qualities. The covering then is crimped or pleated, as at 9, in order to conform its sides 10 with the sides 6 of the tire and the longitudinal edges 11 are arranged in overlapped position covering the inner surface of the rim 7, as best shown in Figure 2. With the edges 11 in this position, an adhesive strip 12 is secured longitudinally around the inner tire rim 7 and thus secures or retains the edges 11 in overlapped position, retaining the covering 8 upon the tire shoe.

The ends of the covering 8 are slightly overlapped and secured by any desired means, not shown. The strip 12 is of a width sufficient to extend beyond the overlapped edges 11 of the covering so that the strip will firmly secure the edges of the strip in position.

Referring now more particularly to that form of my invention depicted in Figures 2 and 3, the wrapping 8 is placed longitudinally around the tire with its longitudinal medial portion disposed adjacent the tire rim and the longitudinal edges thereof overlapped at the tread portion of the tire. When the wrapper is so disposed upon the tire, the wrapping is pleated or crimped, as at 9', adjacent the rim of the tire and then further pleated or crimped, as at 13, adjacent the tread portion of the tire, to conform the same to the irregularities of the tire's surface.

The usual adhesive strip or tape 12 is employed to secure the edges 11 in overlapped position, and if desired, the strip 12 may have printed or otherwise displayed thereon the size and make of tire enclosed, as designated at 14. Also suitable advertising matter may be displayed thereon.

While the wrapping 8 is illustrated as being pleated or crimped, as at 9' and 13 to conform the same to the irregularities of the tire's surface, it will be understood that should the wrapping 8 have sufficient elastic qualities to stretch and conform to the tire's surface, the pleatings or crimpings may be dispensed with.

I am aware that it is old in the art to employ crêpe paper for wrapping or enclosing annular bodies such as vehicle tire shoes, but in all the former structures the wrapping 8 is spirally wound on the body, which has proven very unsatisfactory in that the edges of the spiral catch in various obstacles and become torn thus allowing the entire wrapping to unwind from the tire. With my structure such an occurrence is prevented, as the covering is extended longitudinally around the tire, and should it become snagged or torn, the wrapping will not be removed therefrom.

What I claim is my invention is:

A wrapper for tires comprising an elongated strip of material in the condition of having been placed longitudinally around a tire and made to conform to the irregularities in the surface with its longitudinal edges overlapped, and a single length of tape covering the overlapped edges of said strip of material for securing the same around the tire.

In testimony whereof, I affix my signature.

JOHN SCHERNER.